UNITED STATES PATENT OFFICE.

ARTHUR WEINBERG, OF FRANKFORT-ON-THE-MAIN, GERMANY, ASSIGNOR TO LEOPOLD CASSELLA & CO., OF SAME PLACE.

BLACK AZO DYE.

SPECIFICATION forming part of Letters Patent No. 525,245, dated August 28, 1894.

Application filed May 5, 1894. Serial No. 510,142. (Specimens.) Patented in England March 9, 1893, No. 5,141; in France June 12, 1893, No. 201,770; in Belgium January 31, 1894, No. 108,195; in Italy February 3, 1894, No. 440/69; in Spain February 17, 1894, No. 15,361, and in Austria-Hungary March 5, 1894, No. 44 and No. 299.

*To all whom it may concern:*

Be it known that I, ARTHUR WEINBERG, a subject of the King of Prussia, and a resident of Frankfort-on-the-Main, Germany, have invented new and useful Improvements in the Production of New Black Azo Coloring-Matters, of which the following is a specification.

This invention, for which patents have been obtained in Belgium, No. 108,195, dated January 31, 1894; in Italy, No. 440/69, dated February 3, 1894; in Spain, No. 15,361, dated February 17, 1894; in Austria-Hungary, No. 44 and No. 299, dated March 5, 1894; in Great Britain, No. 5,141, dated March 9, 1893, and in France, certificate of addition, dated June 12, 1893, brevet No. 201,770, relates to the production of new black azo-coloring matters, which derive from diamidodiphenylamin (leucoindamin). Black azo-dye stuffs have hitherto never been obtained from this base. The new coloring matters dye cotton direct and are the first black azo-compounds of this class, which can be fixed on the fiber by oxidation. This characteristic property is the consequence of the presence of the indamine group in the molecule.

The general process of producing the new dye-stuffs consists in treating diamidodiphenylamin with nitrous acid, allowing the tetrazocompound to react upon one molecule of gamma-amidonaphtolsulpho acid which is described in the United States Patent, No. 454,645, granted June 23, 1891, and combining the thus produced intermediate compound directly or indirectly with meta-diamines such as meta phenylenediamine.

In practically carrying out my invention I proceed for instance as follows:

*Example I.* Twenty kilos diamidodiphenylamin are dissolved in water with sixty kilos of hydrochloric acid; to the cooled solution fourteen kilos of nitrite of soda are slowly added, the solution of the tetrazo compound is made alkaline by addition of carbonate of soda. The shade of the solution turns to dark red. It is rapidly mixed with a solution of twenty-four kilos of gamma-amidonaphtolsulfo acid. A black precipitate of the intermediate compound is formed. Then a solution of twelve kilos meta phenylenediamin is added. After standing about twelve hours, the formation of the dye-stuff is completed. It separates from the solution. It is filtered off and dried.

*Example II.* The intermediate compound produced from twenty kilos of diamidodiphenylamin and twenty-four kilos of gamma-amidonaphtolsulfo acid is prepared as described in the first example. Then the solution is acidulated with hydrochloric acid and seven kilos of nitrite of soda are added. As soon as this second diazotation is completed, the solution is introduced into an alkaline solution of twenty-four kilos of meta phenylenediamin. After standing about twelve hours the formation of the dyestuff is completed. It separates from the solution. It is filtered off and dried.

*Example III.* The intermediate compound produced from twenty kilos of diamidodiphenylamin and twenty-four kilos of gamma-amidonaphtolsulfo-acid is diazotised with seven kilos of nitrite of soda, as described in the second example. Then the solution is made alkaline by means of carbonate of soda, and a solution of twenty-four kilos of gamma-amidonaphtolsulfo acid is added. After about half an hour a solution of twelve kilos meta-phenylenediamin is poured into the solution. The formation of the dye-stuff is completed within twelve hours. It separates from the solution. It is filtered off and dried.

*Example IV.* The intermediate compound produced from twenty kilos of diamidodiphenylamin and twenty-four kilos of gamma-amidonaphtolsulfo acid is diazotised and combined with twenty-four kilos of gamma-amidonaphtolsulfo acid as described in the third example. Then the solution is acidulated with hydrochloric acid, and seven kilos of nitrite of soda are added. After about half an hour the diazotised compound is introduced into an alkaline solution of twenty-four kilos of meta phenylenediamin. The formation of the dye-stuff is completed within about twelve hours. It separates from the solution. It is filtered off and dried. The coloring matter resulting from each of these methods is a dark black powder, soluble in hot water with a bluish black shade, insoluble in alcohol, ether or benzene, soluble in concentrated sulfuric acid with a blackish blue shade and is precipitated from this solution by addition of water. By reducing agents the color is destroyed; the characteristical product of the reduction is leuco-indamine, which can easily be recognized by its property of turning green by oxidation. The coloring matter dyes unmordanted cotton in an alkaline bath deep black shades. The dyestuff is completely fixed by a treatment of the dyed fiber with oxidizing agents such as bichromates.

Having now described the nature of my invention and in what manner it can be performed, what I claim as new, and desire to secure by Letters Patent, is—

1. The process for producing new black azo dyes by treating the diamidodiphenylamin (leuco-indamin) with nitrous acid and combining the thus produced tetrazo compound with gamma amidonaphtolsulfo acid and meta diamins such as meta-phenylenediamin, substantially as described.

2. The new coloring matter deriving from diamidodiphenylamin, gamma amidonaphtolsulfo-acid and meta diamins, which is a black powder, soluble in hot water with bluish black color, insoluble in alcohol, ether or benzene, soluble in concentrated sulfuric acid with blue black color, which solution separates a bluish black precipitate on addition of water; adapted for dyeing unmordanted cotton a deep black, which can be fixed by oxidation on the fiber as set forth.

In testimony that I claim the foregoing as my invention I have signed my name, in presence of two witnesses, this 25th day of April, 1894.

ARTHUR WEINBERG.

Witnesses:
JEAN GRUND,
FRANK H. MASON.

It is hereby certified that in Letters Patent No. 525,245, granted August 28, 1894, upon the application of Arthur Weinberg, of Frankfort-on-the-Main, Germany for an improvement in "Black Azo Dyes," errors appear requiring correction, as follows: The Austrian patent previously obtained for the said invention is erroneously described in the printed heading and in the preamble of the specification as follows: "in Austria-Hungary, March 5, 1894, No. 44 and No. 299"; whereas it should have been described as in *Austria, March 5, 1894, 44/299* and that the Letters Patent should be read with these corrections therein that the same may conform to the record of the case in the Patent Office.

Signed, countersigned, and sealed this 11th day of September, A. D. 1894.

[SEAL.]

JNO. M. REYNOLDS,
*Assistant Secretary of the Interior.*

Countersigned:
S. T. FISHER,
*Acting Commissioner of Patents.*